United States Patent Office 2,915,368
Patented Dec. 1, 1959

2,915,368

PREPARATION OF MONO-SILANE

James H. Lorenz, Eggertsville, and Fred R. Whaley, Kenmore, N.Y., assignors to Union Carbide Corporation, a corporation of New York No Drawing. Application December 22, 1958
Serial No. 781,847

5 Claims. (Cl. 23—204)

The present invention relates to silicon chemistry, and more particularly to a process for the preparation of monosilane, $SiH_4$. The application is a continuation-in-part of copending application Serial No. 584,470, filed May 14, 1956.

Due to their highly reactive characteristics, silanes, and mono-silanes in particular, are extremely useful intermediates in the synthesis of many organo-silicon compounds. For example, silanes may be readily halogenated to the corresponding halo-silane derivatives. The atoms of these latter compounds may then be replaced by alkoxy and aroxy groups through reaction with the corresponding alcohol or phenol. Hydrocarbon groups may also be attached directly to the silicon atoms of the halo-silane derivatives by reaction with zinc alkyls, with mercury aryls, with sodium alkyls and aryls, and with the organo-magnesium halides or Grignard reagents. As a consequence of their adaptability to these and other chemical processes, the production of silanes has been the subject of considerable research by prior workers in the field of silicon chemistry.

Silanes have heretofore been prepared by reactions between: (1) silicides and mineral acids; (2) silicides and ammonium bromide; (3) lithium aluminum hydride and silicon chlorides; and (4) by the disproportionation of higher silanes. These processes, however, possess certain adverse characteristics which prevent their satisfactory utilization for the commercial production of mono-silane. For example, the processes in some instances represent prohibitively expensive procedures due to operational requirements, or to the necessary use of scarce reactants. In others, the resulting yields of mono-silane have been too low to justify application of the processes for this particular purpose. Moreover, these processes usually result in the co-production of varying proportions of higher silanes, viz: di- and tri-silanes, $Si_2H_6$ and $Si_3H_8$. Subsequent separation techniques would therefore be required to obtain relatively pure mono-silane.

It is an object of the present invention to overcome the disadvantages of the prior art by providing an improved process for the selective production of mono-silane whereby good yields of the desired product can be obtained substantially free from the presence of higher silanes. It is a further object of the present invention to provide a process for production of mono-silane which will permit the utilization of readily available reactants, and which can be performed in the absence of extreme temperatures and pressures which would otherwise necessitate the use of costly and complex equipment capable of producing and withstanding them.

According to the present invention, siloxane, $Si_6O_3H_6$, is reacted with ammonia under operating conditions as hereinafter described. The reaction results in the formation or evolution of gaseous mono-silane, which can then be collected readily. Prepared in this manner, the mono-silane evolved is not contaminated by the substantial presence of higher silanes and yields are sufficient quantity to warrant application of the process.

In particular, good yields of mono-silane are obtained when the siloxane utilized in the production of mono-silane is initially prepared by reacting a metal disilicide with aqueous mineral acid in the presence of an alcohol. For efficient results, calcium disilicide, $CaSi_2$, is employed as an initial reactant in this process. Among other metal disilicides also capable of reacting with an alcoholic mineral acid to produce siloxene are the disilicides of barium and strontium.

The metal disilicide can be reacted with an aqueous solution of concentrated hydrochloric acid diluted with ethanol. Other acids suitable for the reaction are sulfuric and glacial acetic acids. The alcohol employed can also be any other lower aliphatic alcohol, such as methanol, propanol or butanol. The lower aliphatic alcohols find advantageous utilization in concentrations of from 90 to 97 percent by weight of reaction mixture. Alcohol concentrations outside this range, however, may also be of benfit to the reaction process.

Of primary importance to the preparation of siloxene in the manner heretofore described, for the purposes of the present invention, is the atomic ratio of acidic hydrogen to metal in which the reactants are initially present in the reaction mixture. Variations in this proportion have been found to affect the yield of mono-silane resulting from the subsequent treatment of the prepared siloxene with ammonia. The following table, based upon reactions between calcium disilicide and hydrochloric acid, will better serve to illustrate the effect of this variation. For each run, siloxene was prepared utilizing the reactants in an acidic hydrogen to metal atomic ratio as shown in the table. The siloxene so formed was subsequently reacted with ammonia as hereinafter described to yield mono-silane.

| Preparation of $Si_6O_3H_6$, Acidic Hydrogen/Ca Atomic Ratio | Reaction of $Si_6O_3H_6$ with $NH_3$, Percent Yield of $SiH$ Based Upon Available Silicon |
|---|---|
| 2.0/1 | 14.6 |
| 2.0/1 | 15.1 |
| 2.0/1 | 17.3 |
| 6.5/1 | 18.4 |
| 8.1/1 | 29.0 |
| 8.1/1 | 30.0 |
| 10.0/1 | 33.1 |
| 10.0/1 | 37.2 |
| 10.0/1 | 37.4 |
| 12.2/1 | 19.4 |
| 12.2/1 | 19.1 |
| 18.0/1 | 23.6 |

From the above table, it can be seen that the atomic ratio of acidic hydrogen to metal in which the metal disilicide and hydrochloric acid reactants are preferably present lies between 8 to 1 and 11 to 1, inclusive. Within this range, monosilane yields greater than 25 percent can ultimately be expected. The subsequent reaction of siloxane with ammonia, where the silixene has been prepared by proportions outside this range, may result in less than optimum yields of mono-silane.

The reaction between a metal disilicide and alcoholic mineral acid, forming siloxene, can be performed satisfactorily at temperatures in the range of from 0° C. to 95° C. Generally, however, the reaction velocity at room temperature is such as to be adequate in most cases. Occasional agitation should be applied during the reaction to insure the complete dispersion of, and contact between reactants. The reaction is desirably allowed to proceed to completion, as evidenced by the cessation of hydrogen evolution which accompanies the formation of siloxene. Siloxene is thereby precipitated as a grey powder and may then suitably be separated and prepared for subsequent conversion to mono-silane.

In a preferred embodiment of the invention, siloxene, prepared in the manner described above, is subsequently reacted with ammonia. Siloxene obtained by other means, or from other sources, can also find suitable application in the present process. It has been found, however, that silane yields resulting therefrom usually are quantitatively below those obtained in accordance with the preferred method.

The siloxene can be reacted with either liquid or vaporous ammonia. The use of liquid ammonia is especially to be desired since it permits a more intimate contact between reactants. The reaction time required for completion is thereby decreased, and amounts of mono-silane produced advantageously affected. The ratio in which the reactants are employed has not been found critical to the invention.

The treatment of siloxene with ammonia is necessarily performed in a manner inhibiting the spontaneous oxidation of siloxene or mono-silane. Accordingly, an inert atmosphere must be maintained in the reaction system. The inert gases, argon or helium in particular, may be used to assist in the maintenance of this inert atmosphere especially whenever carriers for the reactants are found desirable or necessary. Following the introduction of reactants, the reaction system may be effectively evacuated to further insure the absence of a combustion supporting atmosphere, at the same time aiding the evolution of mono-silane. Other methods of assuring the presence of this inert atmosphere can also be employed.

The conversion of siloxene to mono-silane by reaction with liquid ammonia is necessarily performed at a temperature of at least $-33°$ C., higher temperatures engendering increased yields of the desired product. The reaction temperature must, however, be lower than the decomposition temperature of the reactants or the reaction product. In conformance therewith, the reaction mixture is raised to at least the minimal temperature of $-33°$ C. At this temperature mono-silane is evolved and ammonia simultaneously vaporized. Thereafter, any means of separating mono-silane from the other reaction products, i.e., from hydrogen and ammonia vapor, convenient to the operation, can be utilized. For example, mono-silane and ammonia may be solidified in a liquid nitrogen-cooled trap, thus leaving hydrogen in the gas phase. The hydrogen vapor may then be measured and removed. Subsequently raising the temperature of the solid phase to the boiling point of mono-silane, $-112°$ C. will permit the evolution of mono-silane, while ammonia remains as a solid.

The reaction between siloxene and liquid ammonia can be performed at temperatures above $-33°$ C. by elevating the boiling point of the ammonia. A recommended method permitting an increase in reaction temperature while maintaining ammonia in a liquid phase is by the addition of an ammonium salt such as ammonium iodide to the reaction mixture preferably in proportions of up to approximately 30 percent by weight of reaction mixture. Among other additives equally suitable for this purpose are ammonium bromide and ammonium chloride. In addition, other operational techniques, such as the use of pressure, can be employed similarly to improve the mono-silane yields.

Mono-silane can also be prepared by the reaction of siloxene and gaseous ammonia at a temperature of at least 300° C. Preferably, the reaction is conducted at a temperature within the range of from 300° C. to 400° C., with particularly efficient results realizable at a reaction temperature of about 350° C. At a temperature below about 300° C., little if any production of mono-silane can be expected, while the maximum operable reaction temperature is determined by the decomposition temperature of the reactants or the reaction product.

A convenient method for carrying out the reaction between siloxene and gaseous ammonia, for example, involves charging the siloxene reactant to a suitable reactor, such as a tube furnace, to which a flow of ammonia gas, preferably in an inert carrier such as helium or argon, is also introduced. The reaction system is then elevated to a temperature of at least 300° C., whereupon mono-silane is evolved and can be recovered by separation techniques such as those described above. Other procedures for carrying out the reaction of siloxene and ammonia to produce mono-silane, in the light of this disclosure, may occur to those skilled in the art, and can be employed in accordance with the invention.

This invention will be illustrated in greater detail by description in connection with the following specific examples of its practice, but is not to be necessarily limited thereby.

*Example I*

Siloxene was prepared in a manner preferred by the invention by adding 6.7 grams of calcium disilicide (0.05 mole) to a solution of 41.5 milliliters of concentrated hydrochloric acid (0.50 mole) in 1000 milliliters of ethanol. Thus, the reactants were employed in an acidic hydrogen to metal atomic ratio of 10 to 1. The reaction mixture was allowed to stand at room temperature for 17 hours while being continually agitated, whereupon a grey precipitate, siloxene, was formed. The precipitate was then separated by filtration, washed with ethanol, and transferred while moist to be vacuum dried at 60° C.

1.2031 grams of siloxene prepared in the above manner was weighed in argon in a sample holder which was subsequently attached to a system containing a glass trap reactor with provision for introducing the charge of siloxene, two manometers, a glass trap cooled by liquid nitrogen, a gas measuring burette and a vacuum pump. Approximately 16 milliliters of liquid ammonia was condensed from a cylinder into the reactor at $-50°$ C. and the siloxene charge thereafter introduced to the reactor while maintaining an inert atmosphere therein. The system was suitably evacuated and the reactor allowed to warm up to $-33°$ C. As the reaction proceeded, the evolved mono-silane and vaporized ammonia were condensed in the liquid nitrogen-cooled trap, leaving any evolved hydrogen in the gas phase. The hydrogen was measured and pumped off. The trap containing mono-silane and ammonia was then warmed up to $-112°$ C. by the substitution of trichloromonofluoromethane (Freon 11) at its freezing point for liquid nitrogen. At this temperature the mono-silane was vaporized and measured, while ammonia remained as a solid in the trap. A pressure of 263 millimeters in a total volume of 823.8 cubic centimeters was found due essentially to monosilane vapor. This is equivalent to 0.141 gram of mono-silane and calculates to approximately a 37.4 percent yield of mono-silane based upon available silicon, i.e., silicon originally present as calcium disilicide. A mass survey in a mass spectrometer confirmed the presence of over 96 percent mono-silane in the yield and less than 0.1 percent of higher silanes.

*Example II*

Using the same reaction system described in Example I, 2 grams of ammonium iodide was added to the reactor prior to condensing in the 16 cubic centimeters of ammonia. 0.8099 gram of siloxene prepared by the reaction of calcium disilicide and hydrochloric acid as described above in Example I, utilizing an acidic hydrogen to metal atomic ratio of 18 to 1, was added to the reactor, the system evacuated and the temperature of the reaction mixture was raised to $+20°$ C. At this temperature a liquid system was still maintained, and reaction proceeded. After the hydrogen was measured and pumped off, a pressure of 140 millimeters in a total volume of 461 cubic centimeters was found due essentially to mono-silane vapor. This calculates to approximately a 29.3 percent yield of mono-silane based on available silicon.

*Example III*

A 0.4788 gram sample of siloxene, prepared by the reaction of calcium disilicide and hydrochloric acid as described in Example I, utilizing an acidic hydrogen to metal atomic ratio of 10 to 1, was charged through a 1-inch Vycor tube to a 1-inch tube furnace which, in turn, was attached to a system containing 2 mercury back-pressure traps, a bubble trap, a manometer, and a glass trap cooled by liquid nitrogen. During the procedure, an inert atmosphere was maintained. A flow of ammonia gas, in a helium carrier gas stream, was then introduced to the furnace and the temperature therein slowly elevated. When the temperature within the furnace reached 300° C., as measured by a thermocouple attachment, a noticeable reaction occurred as evidenced by a discoloration of the siloxene reactant and an increase in gas evolution. The temperature within the furnace was then raised to 350° C., maintained at this level for thirty minutes and subsequently raised to 400° C. until further reaction could no longer be observed. The ammonia and evolved mono-silane were condensed in the liquid nitrogen-cooled trap and transferred to a gas-measuring system. A pressure of 55 millimeters of mercury in a total volume of 797 cubic centimeters was found due essentially to mono-silane vapor. This calculates to a mono-silane yield of approximately 31.6 percent based upon available silicon. To confirm the results, a duplicate experiment was conducted, whereupon a mono-silane yield of approximately 39.1 percent based upon available silicon was obtained.

What is claimed is:

1. A process for the production of mono-silane which comprises contacting siloxene with gaseous anhydrous ammonia in an inert atmosphere, at a temperature of at least 300° C.

2. A process for the production of mono-silane which comprises contacting siloxene with gaseous anhydrous ammonia in an inert atmosphere, at a temperature of between 300° C. and 400° C., and recovering the mono-silane product thereby formed.

3. A process for the production of mono-silane which comprises contacting siloxene with gaseous anhydrous ammonia in an inert atmosphere, at a temperature of between 300° C. and 400° C., and recovering the mono-silane product thereby formed by fractional vaporization.

4. A process for the production of mono-silane which comprises contacting at least one metal disilicide selected from the group consisting of calcium disilicide, barium disilicide and strontium disilicide with aqueous mineral acid in the presence of alcohol, at a temperature of between 0° C. and 95° C., said mineral acid and metal disilicide being present in an acidic hydrogen to metal atomic ratio of between about 8 to 1 and 11 to 1, separating the siloxene thereby formed, reacting said siloxene with gaseous anhydrous ammonia in an inert atmosphere, at a temperature of at least 300° C., and recovering the mono-silane product thereby formed.

5. A process for the production of mono-silane which comprises contacting at least one metal disilicide selected from the group consisting of calcium disilicide, barium disilicide and strontium disilicide with aqueous mineral acid in the presence of alcohol, at a temperature of between 0° C. and 95° C., said mineral acid and metal disilicide being present in an acidic hydrogen to metal atomic ratio of between about 8 to 1 and 11 to 1, separating the siloxene thereby formed, reacting said siloxene with gaseous anhydrous ammonia in an inert atmosphere, at a temperature of between 300° C. and 400° C., and recovering the mono-silane product thereby formed.

References Cited in the file of this patent

Kautsky: "Zeitschrift für Anorganische und Allgemeine Chemie," vol. 117, pages 209–217 (1921).